(12) United States Patent
Dixit et al.

(10) Patent No.: US 8,231,820 B2
(45) Date of Patent: Jul. 31, 2012

(54) EPOXY RESIN COMPOSITION

(75) Inventors: Amit Dixit, Bhopal (IN); Pradip Kumar Dubey, Dist. Goraadhpur (IN); Thitikan Prommaneewat, Muang Rayong (TH)

(73) Assignee: Aditya Birla Chemicals (Thailand) Ltd., Bangkok (TH)

( * ) Notice: Subject to any disclaimer, the term of this patent is extended or adjusted under 35 U.S.C. 154(b) by 298 days.

(21) Appl. No.: 12/808,304

(22) PCT Filed: Sep. 16, 2008

(86) PCT No.: PCT/IN2008/000591
§ 371 (c)(1),
(2), (4) Date: Jun. 15, 2010

(87) PCT Pub. No.: WO2009/084014
PCT Pub. Date: Jul. 9, 2009

(65) Prior Publication Data
US 2010/0280191 A1   Nov. 4, 2010

(30) Foreign Application Priority Data
Dec. 31, 2007  (IN) .......................... 2614/MUM/2007

(51) Int. Cl.
*C08J 5/08* (2006.01)
*C08L 63/02* (2006.01)
*B32B 27/04* (2006.01)
(52) U.S. Cl. .................. 264/331.12; 428/413; 523/466
(58) Field of Classification Search .......................... None
See application file for complete search history.

(56) References Cited

U.S. PATENT DOCUMENTS

| 5,505,895 A | 4/1996 | Bull et al. |
| 5,942,182 A * | 8/1999 | Hoge et al. ..................... 264/510 |
| 2007/0007692 A1 * | 1/2007 | Lehmann et al. ............. 264/299 |
| 2009/0062441 A1 * | 3/2009 | Wei et al. ....................... 524/198 |

FOREIGN PATENT DOCUMENTS

| GB | 2408005 A | 5/2005 |
| WO | WO 85/05069 A1 * | 11/1985 |

* cited by examiner

*Primary Examiner* — Robert Sellers
(74) *Attorney, Agent, or Firm* — Robert P. Michal; Lucas & Mercanti, LLP

(57) ABSTRACT

A process for making a molded composite comprising the following steps: reacting a reaction mass containing a polyepoxide, in the proportion of about 20% to 50% with respect to the reaction mass, a diol, in the proportion of about 10% to 20% with respect to the reaction mass, a hardener, in the proportion of about 20% to 50% with respect to the reaction mass, in the presence of an accelerator in the proportion of about 0.5 to 10.0% with respect to the reaction mass either alone or in solution with compatible diluents, to obtain an epoxy resin mix having intrinsic viscosity in the range of 100 to 850 cPs, pouring the resin mix in a mold having an in-situ glass fiber scaffold at a mold temperature in the range of 45 to 50 C. and applying pressure to the resin mix in the mold to form a compressed green composition: partially curing the compressed green composition at a temperature in the range of 60 to 80 C. to obtain a partially cured composite; and further curing the partially cured composite at a temperature in the range of 80 to 90 C. to obtain a fully cured composite. The composite is used for structural applications like windmill blades, yachts, domes, ships made from a composite made in accordance with the process as mentioned herein.

27 Claims, No Drawings

EPOXY RESIN COMPOSITION

CROSS-REFERENCE TO RELATED APPLICATIONS

This application is a 371 of PCT/IN2008/000591 filed on Sep. 16, 2008, which claims the benefit of Indian patent application No. 2614/MUM/2007 filed on Dec. 31, 2007, the contents of each of which are incorporated herein by reference.

FIELD OF INVENTION

This invention relates to a polymer composition.
More particularly, this invention relates to a composition of resins.

BACKGROUND OF THE INVENTION

Epoxy resins are a group of synthetic resins used to make plastics and adhesives. The viscosity, epoxy equivalent weight and molecular weight are the important properties of epoxy resins. These materials are of great importance because of their formulating and processing versatility. Epoxy resins can be used as coating agents because of their high resistance to chemicals and outstanding adhesion, durability, and toughness. Because of their high electrical resistance, durability at high and low temperatures, and the ease with which they can be poured or cast without forming bubbles, epoxy resins are especially useful for encapsulating electrical and electronic components. Epoxy resin adhesives can be used on metals, construction materials and synthetic resins. They are strong enough to be used in place of rivets and welds in certain industrial applications.

There are two main categories of epoxy resins, namely the glycidyl epoxy, and non-glycidyl epoxy resins. The glycidyl epoxies are further classified as glycidyl-ether, glycidyl-ester and glycidyl-amine. The non-glycidyl epoxies are either aliphatic or cycloaliphatic epoxy resins. Bisphenol-A based epoxy resins are the most frequently used epoxy resins available commercially.

The curing process is a chemical reaction in which the epoxy or the 'oxirane' ring opens up and reacts with the hardener or curing agent to form three-dimensional, infusible network without forming any byproduct at ambient or elevated temperatures depending upon the nature and use of hardeners. A wide variety of hardeners are available for epoxy resins. The choice of epoxy resin and hardener depends upon the process, desired properties and applications of the cured material. The stoichiometry of the epoxy-hardener system also affects the properties of the cured material. The commonly used curing agents for curing epoxy reins are amines, carboxylic acid anhydrides, polyamides, phenolic resins, isocyanates and polymercaptans. The amine and phenolic resin based hardeners are widely used for curing the epoxy resins.

When anhydrides are used as curing agents or as a hardener, curing accelerators are normally used. The catalyst or accelerator is typically used to accelerate the reaction between epoxy resin and a hardener. Many types of accelerators, such as tertiary amine, boric-acid ester, Lewis acid, organic metal compounds, organic metal salts, and imidazole are widely used.

Resin infusion (RI) or vacuum assisted resin transfer molding (VARTM), is a closed mold process that uses the vacuum bagging technique to compress laminates. Dry laminates are placed in the mold and wet out after the vacuum is applied. After the air is evacuated from the vacuum envelope, the resin is allowed to flow through ports in the vacuum bag into the laminate stacks. This method offers easier handling and fitting of the dry materials in the mold, and the increased compaction produces laminates with low resin content. Epoxy resin-hardener systems for these processes have low viscosity for easy and fast impregnation (less than 300 cP, at processing temperature). Furthermore, these systems also offer several advantages which include fast development of mechanical strength, longer pot life, low exotherm, low vapor pressure, good fiber wetting property, compatibility with consumables and the last but not the least minimum handling risk.

DEFINITIONS

In the context of this invention the term "Pot life or working life" means the working time or the length of time that a catalyzed resin system retains a viscosity low enough to be used in processing.

"Green composition" means a composition which is uncured or partially cured or the composition is not fully set or matured.

"Hardener or curing agent" means a substance or mixture of substance added to a material to increase or control the curing reaction by taking part in it.

"Catalyst or accelerator" means a substance that causes or accelerates a chemical reaction.

"Glass fibre scaffold" means a stack of reinforcement made by cutting and placing different number and types of glass fabrics such as Unidirectional, bi-axial and tri-axial.

Existing Knowledge:

Historically, an epoxy resin and hardener comprising liquid Bisphenol-A resins modified with diglycidyl ether of 1,4-butane diol or diglycidyl ether of 1,6-hexane diol with a combination of cycloaliphatic amines, that is Isophoronediamine (IPDA), 3,3'-Dimethyl-4,4'-diaminodicyclohexylmethane and polyoxyether diamine, polyoxyether triamine as hardeners is very popular and provides a combination of improved physical, thermal, mechanical, and electrical properties with all types of reinforcements including glass and carbon fiber. The pot life of the mix can be varied by altering the temperature. At higher temperatures of about 30-40° C., processing is easy for infusion due to low viscosity of the mix but this restricts working time/pot life and increases the temperature of the exothermic reaction drastically. A high exotherm affects adversely the core materials, mold, gelcoat, processing equipment, and for consumables. Working time or pot life of the resin hardener mix can be prolonged to certain extent by processing the mix at lower temperature but that leads to another problem of high viscosity of mix and makes infusion difficult, impossible to impregnate, and some areas remains unimpregnated.

US Patent application no. 20050004270 discloses a curable epoxy resin composition comprising a polyepoxide, an anhydride hardener, a 1-substituted imidazole as catalyst, at least a diol and filler. The aforesaid epoxy resin composition is employed to obtain a shaped article with an infusible three dimensional structure for electrical applications using APG and Vacuum casting method.

U.S. Pat. No. 7,202,304 discloses a curable liquid or semi-solid underfill material composition comprising resin, such as epoxy resin and silica particles and curing agents such as polyfunctional anhydride polymers and oligomers. The underfill material may also optionally include catalysts for promoting cross-linking and to control cure time, elastomers for toughening, and/or coupling agents, fillers, fluxing agents, and other additives for flow modification and adhesion.

U.S. Pat. No. 6,562,884 discloses a composition comprising an epoxy resin having, on average, more than one 1,2-epoxy group per molecule, a polyol as epoxy resin curing agent and a solid reaction product of a carboxylic-acid-group-containing microgel and a nitrogen-containing base (microgel-amine adduct) as accelerator.

U.S. Pat. No. 5,942,182 discloses a process for producing a composite article in a resin transfer molding system. This process includes steps of providing a fiber preform in a mold; injecting a matrix resin into the mold, allowing the matrix resin to impregnate the fiber perform and heating the resin impregnated preform to at least about 200.degree.F. Also provided in U.S. Pat. No. 5,942,182 is a matrix resin comprising a liquid epoxy resin component selected from the group of a phenolic novolac epoxy resin, a cycloaliphatic epoxy resin and mixtures thereof, an optional epoxy diluent and at least one latent curing agent that cures only when subjected a temperature of at least about 200 degree F.

OBJECTS OF THE INVENTION

It is an object of the present invention to prepare an improved composition of epoxy resins, hardeners, and accelerators for VARTM and RI processes.

Another object of the present invention is to provide a process for manufacture of epoxy resin compositions whereby the process temperature of the exothermic reaction is reduced.

Yet another object of the present invention is to provide hardener formulation for manufacturing large molded composites.

Yet another object of the present invention is to provide an epoxy resin composition with improved thermal and mechanical properties.

Still another object of the present invention is to provide an epoxy resin composition that is most economical.

SUMMARY OF THE INVENTION

In accordance with the present invention there is provided a process for making a molded composite comprising the following steps:
a. reacting a reaction mass containing
   i a polyepoxide, in the proportion of about 20% to 50% with respect to the reaction mass,
   ii a diol, in the proportion of about 10% to 20% with respect to the reaction mass,
   iii a hardener, in the proportion of about 20% to 50% with respect to the reaction mass,
in the presence of an accelerator in the proportion of about 0.5 to 10% with respect to the reaction mass either alone or in a solution with compatible diluents, to obtain an epoxy resin mix having intrinsic viscosity in the range of 100 to 850 cPs and pot life in the range of 250 to 350 minutes at 50° C.;
b. pouring the resin mix in a mold having an in-situ glass fiber scaffold, at a mold temperature in the range of 45 to 50° C. and applying pressure to the resin mix in the mold in the range of 0-30 mbar to form a compressed green composition;
c. partially curing the compressed green composition at a temperature in the range of 60 to 80° C. for 2 to 4 hrs to obtain a partially cured composite; and
d. further curing the partially cured composite at a temperature in the range of 80 to 90° C. for 8 to 10 hrs to obtain a fully cured composite.

Typically, the polyepoxide is at least one selected from the derivatives of bisphenol-A, Bisphenol-F and cycloaliphatic epoxy resins.

Preferably, the polyepoxide is liquid diglycidyl ether of bisphenol A.

Typically, the polyepoxide is modified with a diol.

Typically, the diol is at least one selected from monofunctional and/or multifunctional aliphatic and/or aromatic ethers and derivatives thereof.

Preferably, the diol is diglycidyl ether of polypropylene glycol and diglycidyl ether of diglycidyl ether of 1,4-butanediol.

Typically, the hardener is a Polyfunctional carboxylic acid anhydride.

Preferably, the Polyfunctional carboxylic acid anhydride is at least one selected from a group consisting of Hexahydro phthalic anhydride (HHPA), Methyl tetrahydropthalic anhydride (MTHPA), Methylhexahydro phthalic anhydride (MH-HPA), Phthalic anhydride (PA), Maleic anhydride (MA), Nadicmethyl anhydride and Dodecenyl succinic anhydride.

In accordance with one preferred embodiment of the invention the anhydride is Hexahydrophthalic anhydride. In accordance with other preferred embodiment of the invention the anhydride is Methylhexahydrophthalic anhydride. In accordance with another preferred embodiment of the invention the anhydride is Dodecenyl succinic anhydride.

Typically, the anhydride is present in the range of 50 to 90% of the Diglycidylether of bisphenol-A.

Preferably, the anhydride is present in the range of 50 to 70% of the Diglycidylether of bisphenol-A.

More preferably, the anhydride is present in the range of 50 to 65% of the Diglycidylether of bisphenol-A.

Typically, an accelerator is at least one selected from a group consisting of dimethylaminomethyl phenol, Benzyl dimethyl amine, 1-methylimidazole, 2-methylimidazole, 2-ethyl-4-methylimidazole, Benzyl triethyl ammonium chloride, boron trifluoride amine complex and boron trifluoride mono ethylamine.

In accordance with one preferred embodiment of the invention the accelerator is 1-methylimidazole. In accordance with other preferred embodiment of the invention the accelerator is 2-methylimidazole. In accordance with another preferred embodiment of the invention the accelerator is 2-ethyl-4-methylimidazole.

Preferably, the accelerator comprises a solution of 2-ethyl-4-methylimidazole in non-reactive diluents.

Typically, the non-reactive diluent is at least one selected from a group consisting of Dibutyl phthalate, Benzyl alcohol, Dioctyl phthalate, Polypropylene glycol, Polyethylene glycol, Mono propylene glycol and PTMEG.

Typically, the accelerator is in the form of a solution with a concentration in the range of about 20% to 40% of mass by volume of the diluent. Preferably, the concentration of the accelerator used in solution form is 40%.

Typically, the fiber is selected from a group of fibers consisting of carbon, glass, polymer and natural.

More preferably, the fiber is glass fiber.

In accordance with preferred embodiment of the invention, the fiber is a glass fiber.

Typically, the glass fiber is used in the range of 65-75% by mass of the composite. In accordance with the invention, different types of glass fabrics are cut in the desired size and shape and these fabrics are then stacked in the mold one over the other. The number of layers to be used is based on the desired thickness of the final component.

In accordance with preferred embodiment of the invention the partial curing is done in an oven at a temperature in the range of 50 to 65° C.

Typically, the method (step c) is performed at 80° C. for 3 hrs.

Typically, the method (step d) is performed at 90° C. for 8 hrs.

In accordance with this invention there is provided a molded composite made with the process as substantially described herein below.

Another aspect of this invention is to provide a FRP composite used for structural applications like windmill blades, boats, yachts, domes, ships made from a composite made in accordance with the process as mentioned herein.

Economic Significance

The present invention relates to a cost effective epoxy resin system that further uses the cost effective anhydride as a hardener in combination with latent curing agents instead of the conventional hardener systems that uses expensive polyamines or modified polyamines. Furthermore, the epoxy resin system in accordance with this invention does not affect the basic, processing and final application properties of the composites.

DETAILED DESCRIPTION OF THE INVENTION

Accordingly, there is provided a novel three component resin composition system that comprises: Bisphenol-A modified with reactive diluents as an epoxy resin, a polyfunctional carboxylic acid anhydride as a hardener to open and to react with the epoxy ring or 'oxirane' to form three-dimensional, infusible network and substituted imidazole as an accelerator to accelerate the reaction between epoxy resin and a hardener.

The aforementioned composition in accordance with this invention is relatively cheaper with respect to the conventional hardeners used for the epoxy resin systems, thus making overall resin composition more cost effective.

The molded composite prepared in accordance with this invention is used for manufacture of fiber reinforced composites (FRP). These FRP composites in turn find applications in the manufacture of windmill blades, boats, yachts, domes, and ships.

Also provided in accordance with this invention is a process that employs a low viscosity resin composition for easy and fast impregnation of the resin with high pot life at ambient temperature meant for various fabrication processes. Another advantageous feature of the process in accordance with this invention is that the required process temperature for the exothermic reaction is relatively low.

The fiber reinforced composite components manufactured by using the said resin composition system provides improved mechanical and thermal properties. To prepare FRP composites, unidirectional fibers or woven fibers, fabrics are embedded within a thin layer of polymer matrix. The fibers are typically composed of carbon, glass, polymer or natural which imparts strength and stiffness. The polymer matrix on the other hand is commonly made of Polyester, Epoxy or Nylon which binds and protects the fiber from damage and transfer stresses between fibers.

Thus, in accordance with this invention, a process for making a molded composite comprises the following steps:
Firstly, a reaction is carried out with a reaction mass comprising:
a polyepoxide, in the proportion of about 20% to 50% with respect to the reaction mass, a diol, in the proportion of about 10% to 20% with respect to the reaction mass, a hardener, in the proportion of about 20% to 50% with respect to the reaction mass, in the presence of an accelerator in the proportion of about 0.5 to 10% with respect to the reaction mass either alone or in a solution with compatible diluents for 5 to 40 min. to obtain an epoxy resin mix having intrinsic viscosity in the range of 100 to 850 cPs and pot life in the range of 250 to 350 minutes at 50° C.

The basic resin employed in the present invention is at least one selected from the derivatives of Bisphenol-A, Bisphenol-F or Cyclo aliphatic epoxy resins and/or their blends. These epoxy resins are further modified with one or more different types of reactive diluents. Depending upon the desired attribute, a single or combination diluents are used. Commonly used diluents are mono and/or multifunctional aliphatic and/or aromatic ethers like -1-4 butanediol diglycidyl ether, 1-6 hexanediol diglycidyl ether Butyl glycidyl ether Butyl glycidyl ether, C12-C14 glycidyl ether, 2 Ethyl hexyl glycidyl ether, Neopentyl diglycidyl ether, Polypropylene glycol glycidyl ether, Trimethyolpropane triglycidyl ether, Phenyl glycidyl ether, Cresyl glycidyl ether, PTBP glycidyl ether, Epoxidised soybean oil, Epoxidised castor oil and their blends with or without the non reactive diluents -Dibutyl phthalate, Benzylalcohol, Dioctylphthalate, Polypropylenelycol, Polyethylene glycol, Mono propylene glycol, PTMEG.

Hardeners or a mixture of hardeners are added to increase or control the curing reaction by taking part in it. Hardeners used in the present invention are Polyfunctional aliphatic and/or aromatic anhydrides and their combinations with or without any further chemical modifications.

In accordance with one preferred embodiment of the invention Polyfunctional carboxylic acid anhydride hardeners and their adducts are synthesized and used as hardeners.

Liquid carboxylic anhydride adducts with PTMEG, hydrogenated castor oil, mono-propylene glycol (MPG), mono-ethylene glycol (MEG), p-tertiary butyl phenol (PTBP) are prepared in laboratory and used with above epoxy resin.

Preferably, the hardener used in the present invention is least one selected from a group consisting of Hexahydro phthalic anhydride (HHPA), Methyl tetrahydrophthalic anhydride (MTHPA), Methylhexahydro phthalic anhydride (MHHPA), Phthalic anhydride (PA), Maleic anhydride (MA), Nadicmethyl anhydride, Dodecenyl succinic anhydride.

In accordance with one preferred embodiment of the invention, the anhydride is Hexahydrophthalic anhydride. In accordance with another preferred embodiment of the invention, the anhydride is Methylhexahydrophthalic anhydride. In accordance with yet another preferred embodiment of the invention the anhydride is Dodecenyl succinic anhydride.

Typically, the anhydride is present in the range of 50 to 90% of the Diglycidylether of bisphenol-A. Preferably, the anhydride is present in the range of 50 to 65% of the Diglycidylether of bisphenol-A.

The third component disclosed in the composition of the present invention is an accelerator which is at least one selected from a group consisting of dimethylaminomethyl phenol, Benzyl dimethyl amine, 1-methylimidazole, 2-methylimidazole, 2-ethyl-4-methylimidazole, Benzyl triethyl ammonium chloride, Boron trifluoride amine complex and boron trifluoride mono ethylamine.

Preferably, the accelerator is dissolved in the non-reactive diluent.

The non-reactive diluent is at least one selected from a group consisting of Dibutyl phthalate, Benzyl alcohol, Dioctyl phthalate, Polypropylene glycol, Polyethylene glycol, Mono propylene glycol and PTMEG.

In accordance with a preferred embodiment of the invention, the accelerator comprises a solution of 2-ethyl-4 methylimidazole in non-reactive diluents.

Preferably, the accelerator is in the form of a solution with a concentration in the range of about 20% to 40% of mass by volume of the diluent.

More preferably, the concentration of the accelerator used in solution form is 40%.

In the next method step, the resin mix is poured in a mold having an in-situ glass fiber scaffold at a mold temperature in the range of 45 to 50° C. and pressure is applied to the resin mix in the mold in the range of 0-30 mbar to form a compressed green composition.

In accordance with one preferred embodiment of the invention, the resin mixture and the mold are kept at a temperature in the range of 45 to 50° C.

In accordance with other preferred embodiment of the invention, pressure is applied to the resin in the mold for complete infusion of the resin. In accordance with another preferred embodiment of the invention, no pressure is applied to the resin in the mold.

The fiber is selected from a group of fibers consisting of carbon, glass, polymer and natural.

In accordance with preferred embodiment of the invention, the fiber is a glass fiber.

Typically, the glass fiber is used in the range of 65-75% by mass of the composite. In accordance with the invention, different types of glass fabrics are cut in the desired size and shape and these fabrics are then stacked in the mold one over the other. The number of layers to be used is based on the desired thickness of the final component.

The compressed green composition as prepared is subjected to partial curing at a temperature in the range of 60 to 80° C. for 2 to 4 hrs to obtain a partially cured composite. The partial curing is done in an oven at a temperature in the range of 45 to 50° C. In accordance with preferred embodiment of the invention; the partial curing is performed at 80° C. for 3 hrs.

Partially cured composite as obtained is then further cured at a temperature in the range of 80 to 90° C. for 8 to 10 hrs to obtain a fully cured composite. In accordance with preferred embodiment of the invention, the further curing is performed at 90° C. for 8 hrs.

The invention will now be described with respect to the following examples which do not limit the invention in any way and only exemplify the invention.

EXAMPLES

Example 1

A 73 g of liquid bisphenol-A resin, 20 g of diglycidyl ether of polypropylene glycol and 7 g of diglycidyl ether of 1,4-butanediol was taken in a glass beaker and mixed with the help of a mechanical stirrer for 45 minutes. Then 60 g of MTHPA and 8 g of 40% solution of 2E4MZ was added and further mixing was performed for 30 minutes to obtain an epoxy resin mix having intrinsic viscosity in the range of 100 to 850 cPs and pot life in the range of 250 to 350 minutes;

The mix prepared as above was tested for mix viscosity, pot life and the test data are listed in Table 1.

TABLE 1

| Property | Value |
|---|---|
| Initial viscosity of mix at - | |
| 25° C. | 665-675 cP |
| 30° C. | 445-455 cP |
| 40° C. | 225-235 cP |
| 50° C. | 120-130 cP |
| Pot life @ 50° C., 100 g. resin mix | 270-300 min. |
| Reactivity (Rise in viscosity to 10,000 cP at 50° C. for 12 g. mix) | 380-420 min. |

This mix was then cast and cured at 85 deg. C. for 8 hrs and tested for tensile, flexural, Tg, and HDT properties, Test properties are mentioned in Table 2.

TABLE 2

| Property | Value |
|---|---|
| Tensile | |
| Tensile strength | 65-70 MPa |
| E-modulus | 2500-3000 MPa |
| Ultimate elongation | 4-6% |
| Flexural | |
| Flexural strength | 115-125 MPa |
| E-modulus | 2700-3200 MPa |
| Glass transition temperature (Tg) | 80-85° C. |
| Heat distortion temperature | 73-77° C. |

The resin mixture was then poured in a mold having an in-situ glass fiber scaffold at a mold temperature in the range of 45 to 50° C. and pressure was applied to the resin mix in the mold in the range of 0-30 mbar to form a compressed green composition.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table 3.

TABLE 3

| Property | Value |
|---|---|
| Tensile | |
| Tensile strength | 450-500 MPa |
| E-modulus | 27-30 GPa |
| Flexural | |
| Flexural strength | 600-650 MPa |
| Flexural modulus | 20-25 GPa |
| Residual tensile strength (After fatigue test in Tension-Tension Load control mode, 10,000 cycles at 1 Hz frequency) | 450-500 MPa |

Example 2

A 73 g of liquid bisphenol-A resin, 20 g of diglycidyl ether of polypropylene glycol and 7 g of diglycidyl ether of 1,4- butanediol was taken in a glass beaker and mixed with the help of a mechanical stirrer for 45 minutes. Then 75 g of MTHPA and 8 g of 40% solution of 2E4MZ was added and further mixing was performed for 30 minutes to obtain an epoxy resin mix having intrinsic viscosity in the range of 100 to 850 cPs and pot life in the range of 250 to 350 minutes; The mix prepared as above was tested for mix viscosity, pot life and the test data are listed in Table 4.

TABLE 4

| Property | Value |
| --- | --- |
| Initial viscosity of mix at - | |
| 25° C. | 590-600 cP |
| 30° C. | 365-375 cP |
| 40° C. | 175-185 cP |
| 50° C. | 95-105 cP |
| Pot life @ 50° C., 100 g. mix | 320-350 min. |
| Reactivity (Rise in viscosity to 10,000 cP at 50° C. for 12 g. mix) | 380-420 min. |

This mix was then cast and cured at 85 deg. C. for 8 hrs and tested for tensile, flexural, Tg, and HDT properties, Test properties are mentioned in Table 5.

TABLE 5

| Property | Value |
| --- | --- |
| Tensile | |
| Tensile strength | 65-70 MPa |
| E-modulus | 2500-3000 MPa |
| Ultimate elongation | 4-6% |
| Flexural | |
| Flexural strength | 115-125 MPa |
| E-modulus | 2700-3200 MPa |
| Glass transition temperature (Tg) | 90-95° C. |
| Heat distortion temperature | 80-85° C. |

The resin mixture was then poured in a mold having an in-situ glass fiber scaffold at a mold temperature in the range of 45 to 50° C. and pressure was applied to the resin mix in the mold in the range of 0-30 mbar to form a compressed green composition.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table 6.

TABLE 6

| Property | Value |
| --- | --- |
| Tensile | |
| Tensile strength | 450-500 MPa |
| E-modulus | 27-30 GPa |
| Flexural | |
| Flexural strength | 600-650 MPa |
| Flexural modulus | 20-25 GPa |

TABLE 6-continued

| Property | Value |
| --- | --- |
| Residual tensile strength (After fatigue test in Tension-Tension Load control mode, 10,000 cycles at 1 Hz frequency) | 450-500 MPa |

Example 3

A 73 g of liquid bisphenol-A resin, 20 g of diglycidyl ether of polypropylene glycol and 7 g of diglycidyl ether of 1,4-butanediol was taken in a glass beaker and mixed with the help of a mechanical stirrer for 45 minutes. Then 45 g of MTHPA and 8 g of 40% solution of 2E4MZ was added and further mixing was performed for 30 minutes to obtain an epoxy resin mix having intrinsic viscosity in the range of 100 to 850 cPs and pot life in the range of 250 to 350 minutes; The mix prepared as above was tested for mix viscosity, pot life and the test data are listed in Table 7.

TABLE 7

| Property | Value |
| --- | --- |
| Initial viscosity of mix at - | |
| 25° C. | 810-820 cP |
| 30° C. | 600-610 cP |
| 40° C. | 265-275 cP |
| 50° C. | 150-160 cP |
| Pot life @ 50° C., 100 g. mix | 290-320 min. |
| Reactivity (Rise in viscosity to 10,000 cP at 50° C. for 12 g. mix) | 380-420 min. |

This mix was then cast and cured at 85 deg. C. for 8 hrs and tested for tensile, flexural, Tg, and HDT properties, Test properties are mentioned in Table 8.

TABLE 8

| Property | Value |
| --- | --- |
| Tensile | |
| Tensile strength | 60-65 MPa |
| E-modulus | 2500-3000 MPa |
| Ultimate elongation | 4-7% |
| Flexural | |
| Flexural strength | 110-120 MPa |
| E-modulus | 2700-3200 MPa |
| Glass transition temperature (Tg) | 70-80° C. |
| Heat distortion temperature | 65-70° C. |

The resin mixture was then poured in a mold having an in-situ glass fiber scaffold at a mold temperature in the range of 45 to 50° C. and pressure was applied to the resin mix in the mold in the range of 0-30 mbar to form a compressed green composition.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table 9.

TABLE 9

| Property | Value |
| --- | --- |
| Tensile | |
| Tensile strength | 450-500 MPa |
| E-modulus | 27-30 GPa |
| Flexural | |
| Flexural strength | 600-650 MPa |
| Flexural modulus | 20-25 GPa |
| Residual tensile strength (After fatigue test in Tension-Tension Load control mode, 10,000 cycles at 1 Hz frequency) | 450-500 MPa |

Example 4

A 73 g of liquid bisphenol-A resin, 20 g of diglycidyl ether of polypropylene glycol and 7 g of diglycidyl ether of 1,4-butanediol was taken in a glass beaker and mixed with the help of a mechanical stirrer for 45 minutes. Then mixture of 30 g of Methylhexahydro phthalic anhydride (MTHPA) and 30 gm of molten Hexahydro phthalic anhydride (HHPA) was added in the ratio of 1:1 under continuous stirring and 8 g of 40% solution of 2E4MZ was added and further mixing was performed for 30 minutes to obtain an epoxy resin mix having intrinsic viscosity in the range of 100 to 850 cPs and pot life in the range of 250 to 350 minutes; The mix prepared as above was tested for mix viscosity, pot life and the test data are listed in Table 10.

TABLE 10

| Property | Value |
| --- | --- |
| Initial viscosity of mix at - | |
| 25° C. | 765-775 cP |
| 30° C. | 480-490 cP |
| 40° C. | 220-230 cP |
| 50° C. | 105-115 cP |
| Pot life @ 50° C., 100 g. mix | 300-330 min. |
| Reactivity (Rise in viscosity to 10,000 cP at 50° C. for 12 g. mix) | 380-420 min. |

This mix was then cast and cured at 85° C. for 8 hrs and tested for tensile, flexural, Tg, and HDT properties, Test properties are mentioned in Table 11.

TABLE 11

| Property | Value |
| --- | --- |
| Tensile | |
| Tensile strength | 65-70 MPa |
| E-modulus | 2500-3000 MPa |
| Ultimate elongation | 4-8% |
| Flexural | |
| Flexural strength | 110-120 MPa |
| E-modulus | 2700-3200 MPa |
| Glass transition temperature (Tg) | 70-80° C. |

TABLE 11-continued

| Property | Value |
| --- | --- |
| Heat distortion temperature | 65-70° C. |

The resin mixture was then poured in a mold having an in-situ glass fiber scaffold at a mold temperature in the range of 45 to 50° C. and pressure was applied to the resin mix in the mold in the range of 0-30 mbar to form a compressed green composition.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table 12.

TABLE 12

| Property | Value |
| --- | --- |
| Tensile | |
| Tensile strength | 450-500 MPa |
| E-modulus | 27-30 GPa |
| Flexural | |
| Flexural strength | 600-650 MPa |
| Flexural modulus | 20-25 GPa |
| Residual tensile strength (After fatigue test in Tension-Tension Load control mode, 10,000 cycles at 1 Hz frequency) | 450-500 MPa |

Example 5

A 73 g of liquid bisphenol-A resin, 20 g of diglycidyl ether of polypropylene glycol and 7 g of diglycidyl ether of 1,4-butanediol was taken in a glass beaker and mixed with the help of a mechanical stirrer for 45 minutes. Then mixture of 45 g of Methylhexahydro phthalic anhydride (MTHPA) and 15 gm of molten Hexahydro phthalic anhydride (HHPA) was added in the ratio of 0.75:0.25 under continuous stirring and 8 g of 40% solution of 2E4MZ was added and further mixing was performed for 30 minutes to obtain an epoxy resin mix having intrinsic viscosity in the range of 100 to 850 cPs and pot life in the range of 250 to 350 minutes. The mix prepared as above was tested for mix viscosity, pot life and the test data are listed in Table 13.

TABLE 13

| Property | Value |
| --- | --- |
| Initial viscosity of mix at - | |
| 25° C. | 745-755 cP |
| 30° C. | 480-490 cP |
| 40° C. | 220-230 cP |
| 50° C. | 110-120 cP |
| Pot life @ 50° C., 100 g. mix | 300-330 min. |
| Reactivity (Rise in viscosity to 10,000 cP at 50° C. for 12 g. mix) | 380-420 min. |

This mix was then cast and cured at 85 deg. C. for 8 hrs and tested for tensile, flexural, Tg, and HDT properties, Test properties are mentioned in Table 14.

TABLE 14

| Property | Value |
| --- | --- |
| Tensile | |
| Tensile strength | 65-70 MPa |
| E-modulus | 2500-3000 MPa |
| Ultimate elongation | 4-8% |
| Flexural | |
| Flexural strength | 110-120 MPa |
| E-modulus | 2700-3200 MPa |
| Glass transition temperature (Tg) | 70-80° C. |
| Heat distortion temperature | 65-70° C. |

The resin mixture was then poured in a mold having an in-situ glass fiber scaffold at a mold temperature in the range of 45 to 50° C. and pressure was applied to the resin mix in the mold in the range of 0-30 mbar to form a compressed green composition.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table 15.

TABLE 15

| Property | Value |
| --- | --- |
| Tensile | |
| Tensile strength | 450-500 MPa |
| E-modulus | 27-30 GPa |
| Flexural | |
| Flexural strength | 600-650 MPa |
| Flexural modulus | 20-25 GPa |
| Residual tensile strength (After fatigue test in Tension-Tension Load control mode, 10,000 cycles at 1 Hz frequency) | 450-500 MPa |

Example 6

A 73 g of liquid bisphenol-A resin: 20 g of diglycidyl ether of polypropylene glycol and 7 g of diglycidyl ether of 1,4-butanediol was taken in a glass beaker and mixed with the help of a mechanical stirrer for 45 minutes. Then mixture of 54 g of Methylhexahydro phthalic anhydride (MTHPA) and 6 gm of molten Hexahydro phthalic anhydride (HHPA) was added in the ratio of 0.9:0.1 under continuous stirring and 8 g of 40% solution of 2E4MZ was added and further mixing was performed for 30 minutes to obtain an epoxy resin mix having intrinsic viscosity in the range of 100 to 850 cPs and pot life in the range of 250 to 350 minutes; The mix prepared as above was tested for mix viscosity, pot life and the test data are listed in Table 16.

TABLE 16

| Property | Value |
| --- | --- |
| Initial viscosity of mix at - | |
| 25° C. | 760-770 cP |
| 30° C. | 480-490 cP |
| 40° C. | 220-230 cP |
| 50° C. | 110-120 cP |
| Pot life @ 50° C., 100 g. mix | 300-330 min. |
| Reactivity (Rise in viscosity to 10,000 cP at 50° C. for 12 g. mix) | 380-420 min. |

This mix was then cast and cured at 85 deg. C. for 8 hrs and tested for tensile, flexural, Tg, and HDT properties, Test properties are mentioned in Table 17.

TABLE 17

| Property | Value |
| --- | --- |
| Tensile | |
| Tensile strength | 65-70 MPa |
| E-modulus | 2500-3000 MPa |
| Ultimate elongation | 4-8% |
| Flexural | |
| Flexural strength | 110-120 MPa |
| E-modulus | 2700-3200 MPa |
| Glass transition temperature (Tg) | 70-80° C. |
| Heat distortion temperature | 65-70° C. |

The resin mixture was then poured in a mold having an in-situ glass fiber scaffold at a mold temperature in the range of 45 to 50° C. and pressure was applied to the resin mix in the mold in the range of 0-30 mbar to form a compressed green composition.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table 18.

TABLE 18

| Property | Value |
| --- | --- |
| Tensile | |
| Tensile strength | 450-500 MPa |
| E-modulus | 27-30 GPa |
| Flexural | |
| Flexural strength | 600-650 MPa |
| Flexural modulus | 20-25 GPa |
| Residual tensile strength (After fatigue test in Tension-Tension Load control mode, 10,000 cycles at 1 Hz frequency) | 450-500 MPa |

Example 8

A 73 g of liquid bisphenol-A resin, 23 g of diglycidyl ether of polypropylene glycol and 7 g of diglycidyl ether of 1,4- butanediol was taken in a glass beaker and mixed with the help of a mechanical stirrer for 45 minutes. To this mixture, 60 g of Methylhexahydro phthalic anhydride (MTHPA) was added under continuous stirring and further mixing was performed for 30 minutes to obtain an epoxy resin mix having intrinsic viscosity in the range of 100 to 850 cPs. However the mix was not found to be cured at 50 deg. C. and hence other properties were not determined.

Example 9

A 73 g. of liquid bisphenol-A resin, 23 g of diglycidyl ether of polypropylene glycol and 7 g of diglycidyl ether of 1,4-butanediol was taken in a glass beaker and mixed with the help of a mechanical stirrer for 45 minutes. Then 60 g of MTHPA and then mixture of 4 g of 40% solution of 2-ethyl-4-methyl imidazole (2E4MZ) and 4 g of 40% solution of 1-methyl imidazole (1-MI) was added in the ratio of 1:1 and further mixing was performed for 30 minutes to obtain an epoxy resin mix having intrinsic viscosity in the range of 100 to 850 cPs and pot life in the range of 250 to 350 minutes. However it was observed that the solution of 1-MI in the diluent was not stable and precipitated on storage. Hence further experiments were not conducted.

Example 10

A 73 g of liquid bisphenol-A resin, 20 g of diglycidyl ether of polypropylene glycol and 7 g of diglycidyl ether of 1,4-butanediol was taken in a glass beaker and mixing was started with the help of a mechanical stirrer. Then 60 g of MTHPA and 8 g of 40% solution of 2E4MZ was added under continuous stirring. The mixing was continued for 45 minutes to obtain an epoxy resin mix having intrinsic viscosity in the range of 100 to 850 cPs and pot life in the range of 250 to 350 minutes; The mix prepared as above was tested for mix viscosity, pot life and the test data are listed in Table (19).

TABLE 19

| Property | Value |
| --- | --- |
| Initial viscosity of mix at - | |
| 25° C. | 665-675 cP |
| 30° C. | 445-455 cP |
| 40° C. | 225-235 cP |
| 50° C. | 120-130 cP |
| Pot life @ 50° C., 100 g. mix | 270-300 min. |
| Reactivity (Rise in viscosity to 10,000 cP at 50° C. for 12 g. mix) | 380-420 min. |

This mix was then cast and cured at 85 deg. C. for 8 hrs and tested for tensile, flexural, Tg, and HDT properties, Test properties are mentioned in Table (20).

TABLE 20

| Property | Value |
| --- | --- |
| Tensile | |
| Tensile strength | 65-70 MPa |
| E-modulus | 2500-3000 MPa |
| Ultimate elongation | 4-6% |
| Flexural | |
| Flexural strength | 115-125 MPa |
| E-modulus | 2700-3200 MPa |

TABLE 20-continued

| Property | Value |
| --- | --- |
| Glass transition temperature (Tg) | 80-85° C. |
| Heat distortion temperature | 73-77° C. |

The resin mixture was then poured in a mold having an in-situ glass fiber scaffold at a mold temperature in the range of 45 to 50° C. and then transferred to an oven which was directly heated to 100° C. for 8 hrs and pressure was applied to the resin mix in the mold in the range of 0-30 mbar to form a molded composite.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table (21).

TABLE 21

| Property | Value |
| --- | --- |
| Tensile | |
| Tensile strength | 450-500 MPa |
| E-modulus | 27-30 GPa |
| Flexural | |
| Flexural strength | 600-650 MPa |
| Flexural modulus | 20-25 GPa |
| Residual tensile strength (After fatigue test in Tension-Tension Load control mode, 10,000 cycles at 1 Hz frequency) | 450-500 MPa |

Example 11

A 132 g of liquid bisphenol-A resin, 42 g of diglycidyl ether of polypropylene glycol and 16 g of diglycidyl ether of 1,4-butanediol was taken in a glass beaker and mixed with the help of a mechanical stirrer for 45 minutes. Then 130 g of MTHPA and 16 g of 40% solution of 2-ethyl-4-methylimidazole was added and further mixing was performed for 30 minutes to obtain an epoxy resin mix having intrinsic viscosity in the range of 100-850 cPs and pot life in the range of 250-350 minutes;

The mix prepared as above was tested for mix viscosity, pot life and the test data are listed in Table 22.

TABLE 22

| Property | Value |
| --- | --- |
| Initial viscosity of mix at - | |
| 25° C. | 470-480 cPs |
| 30° C. | 220-230 |
| 40° C. | 125-135 |
| 50° C. | 100-110 |
| Pot life @ 50° C., 100 g. resin mix | 320-350 min. |
| Reactivity (Rise in viscosity to 10,000 cP at 50° C. for 12 g. mix) | 380-420 min. |

This mix was then cast and cured at 85 deg. C. for 8 hrs and tested for tensile, flexural, Tg, and HDT properties, Test properties are mentioned in Table 23.

TABLE 23

| Property | Value |
| --- | --- |
| Tensile | |
| Tensile strength | 65-75 MPa |
| E-modulus | 2500-3000 MPa |
| Ultimate elongation | 4-6% |
| Flexural | |
| Flexural strength | 110-120 MPa |
| E-modulus | 2700-3200 MPa |
| Glass transition temperature (Tg) | 75-85° C. |
| Heat distortion temperature | 65-70° C. |

The resin mixture was then poured in a mold having an in-situ glass fiber scaffold at a mold temperature in the range of 45 to 50° C. and pressure was applied to the resin mix in the mold in the range of 0-30 mbar to form a compressed green composition.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table 24.

TABLE 24

| Property | Value |
| --- | --- |
| Tensile | |
| Tensile strength | 450-500 MPa |
| E-modulus | 27-30 GPa |
| Flexural | |
| Flexural strength | 600-650 MPa |
| Flexural modulus | 20-25 GPa |
| Residual tensile strength (After fatigue test in Tension-Tension Load control mode, 10,000 cycles at 1 Hz frequency) | 450-500 MPa |

Example 12

A 144 gm of liquid bisphenol-A resin, 48 g of diglycidyl ether of polypropylene glycol and 10.5 g of diglycidyl ether of 1,4-butanediol was taken in a glass beaker and mixed with the help of a mechanical stirrer for 45 minutes. Then 136 gm of MTHPA and 19.5 g of 40% solution of 2-ethyl-4-methylimidazole was, added and further mixing was performed for 30 minutes to obtain an epoxy resin mix having intrinsic viscosity in the range of 100-850 cPs and pot life in the range of 250-350 minutes;

The mix prepared as above was tested for mix viscosity, pot life and the test data are listed in Table 25.

TABLE 25

| Property | Value |
| --- | --- |
| Initial viscosity of mix at - | |
| 25° C. | 515-525 cP |
| 30° C. | 340-350 cP |
| 40° C. | 145-155 cP |
| 50° C. | 100-110 cP |
| Pot life @ 50° C., 100 g. resin mix | 290-320 min. |
| Reactivity (Rise in viscosity to 10,000 cP at 50° C. for 12 g. mix) | 380-420 min. |

This mix was then cast and cured at 85 deg. C. for 8 hrs and tested for tensile, flexural, Tg, and HDT properties, Test properties are mentioned in Table 26.

TABLE 26

| Property | Value |
| --- | --- |
| Tensile | |
| Tensile strength | 70-75 MPa |
| E-modulus | 2500-3000 MPa |
| Ultimate elongation | 4-6% |
| Flexural | |
| Flexural strength | 120-130 MPa |
| E-modulus | 2700-3200 MPa |
| Glass transition temperature (Tg) | 80-90° C. |
| Heat distortion temperature | 70-80° C. |

The resin mixture was then poured in a mold having an in-situ glass fiber scaffold at a mold temperature in the range of 45 to 50° C. and pressure was applied to the resin mix in the mold in the range of 0-30 mbar to form a compressed green composition.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table 27.

TABLE 27

| Property | Value |
| --- | --- |
| Tensile | |
| Tensile strength | 450-500 MPa |
| E-modulus | 27-30 GPa |
| Flexural | |
| Flexural strength | 600-650 MPa |
| Flexural modulus | 20-25 GPa |
| Residual tensile strength (After fatigue test in Tension-Tension Load control mode, 10,000 cycles at 1 Hz frequency) | 450-500 MPa |

Example 13

A 193.5 g of liquid bisphenol-A resin, 50 g of diglycidyl ether of polypropylene glycol and 14.5 g of diglycidyl ether of 1,4-butanediol was taken in a glass beaker and mixed with the help of a mechanical stirrer for 45 minutes. Then 150.5 g of MTHPA and 21.5 g of 40% solution of 2-ethyl-4-methylimidazole was added and further mixing was performed for 30 minutes to obtain an epoxy resin mix having intrinsic viscosity in the range of 100-850 cPs and pot life in the range of 250-350 minutes;

The mix prepared as above was tested for mix viscosity, pot life and the test data are listed in Table 28.

TABLE 28

| Property | Value |
| --- | --- |
| Initial viscosity of mix at - | |
| 25° C. | 600-610 cP |
| 30° C. | 370-380 cP |
| 40° C. | 180-190 cP |
| 50° C. | 115-125 cP |
| Pot life @ 50° C., 100 g. resin mix | 300-330 min. |
| Reactivity (Rise in viscosity to 10,000 cP at 50° C. for 12 g. mix) | 380-420 min. |

This mix was then cast and cured at 85 deg. C. for 8 hrs and tested for tensile, flexural, Tg, and HDT properties, Test properties are mentioned in Table 29.

TABLE 29

| Property | Value |
| --- | --- |
| Tensile | |
| Tensile strength | 65-70 MPa |
| E-modulus | 2500-3000 MPa |
| Ultimate elongation | 4-6% |
| Flexural | |
| Flexural strength | 110-120 MPa |
| E-modulus | 2500-3200 MPa |
| Glass transition temperature (Tg) | 70-80° C. |
| Heat distortion temperature | 60-65° C. |

The resin mixture was then poured in a mold having an in-situ glass fiber scaffold at a mold temperature in the range of 45 to 50° C. and pressure was applied to the resin mix in the mold in the range of 0-30 mbar to form a compressed green composition.

Partial curing of the compressed green composition was done at a temperature in the range of 60 to 80° C. for 2 to 4 hrs to obtain a partially cured composite.

Further curing of the partially cured composite was done at a temperature in the range of 80 to 90° C. for 8 to 10 hrs to obtain a molded composite.

The molded composite was tested for tensile, flexural and fatigue properties in tension-tension mode. Test properties are given in Table 30.

TABLE 30

| Property | Value |
| --- | --- |
| Tensile | |
| Tensile strength | 450-500 MPa |
| E-modulus | 27-30 GPa |

TABLE 30-continued

| Property | Value |
| --- | --- |
| Flexural | |
| Flexural strength | 600-650 MPa |
| Flexural modulus | 20-25 GPa |
| Residual tensile strength (After fatigue test in Tension-Tension Load control mode, 10,000 cycles at 1 Hz frequency) | 450-500 MPa |

While considerable emphasis has been placed herein on the specific structure of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A process for making a molded composite comprising the following steps:
   a. reacting a reaction mass containing
      i a polyepoxide, in the proportion of about 20% to 50% with respect to the reaction mass,
      ii a diol, a diglycidyl ether of polypropylene glycol, or a diglycidyl ether of 1,4-butanediol, in the proportion of about 10% to 20% with respect to the reaction mass,
      iii a hardener, in the proportion of about 20% to 50% with respect to the reaction mass,
   in the presence of an accelerator in the proportion of about 0.5 to 10.0% with respect to the reaction mass either alone or in solution with compatible diluents, to obtain an epoxy resin mix having intrinsic viscosity in the range of 100 to 850 cPs and pot life in the range of 250 to 350 minutes at 50° C.;
   b. pouring the resin mix in a mold having an in-situ glass fiber scaffold at a mold temperature in the range of 45 to 50° C. and applying pressure to the resin mix in the mold in the range of 0-30 mbar to form a compressed green composition;
   c. partially curing the compressed green composition at a temperature in the range of 60 to 80 C. for 2 to 4 hrs to obtain a partially cured composite; and
   d. further curing the partially cured composite at a temperature in the range of 80 to 90° C. for 8 to 10 hrs. to obtain a fully cured composite.

2. A process as claimed in claim 1, wherein the polyepoxide is selected from the group consisting of the derivatives of Bisphenol-A, Bisphenol-F and cyclo aliphatic epoxy resins.

3. A process as claimed in claim 1, wherein the polyepoxide is the liquid diglycidyl ether ofbisphenol A.

4. A process as claimed in claim 1, wherein the polyepoxide is modified with a diol.

5. A process as claimed in claim 3, wherein the diol is selected from mono and/or multifunctional aliphatic and/or aromatic ethers and derivatives thereof.

6. A process as claimed, in claim 4, wherein the diol is diglycidyl ether of polypropylene glycol.

7. A process as claimed in claim 4, wherein the diol is diglycidyl ether of 1,4-butanediol.

8. A process as claimed in claim 1, wherein the hardener is a Polyfunctional carboxylic acid anhydride.

9. A process as claimed in claim 8, wherein the Polyfunctional carboxylic acid anhydride is selected from the group consisting of Hexahydro phthalic anhydride (HHPA), Methyl tetrahydropthalic anhydride (MTHPA), Methylhexahydro phthalic anhydride (MHHPA), Phthalic anhydride (PA), Maleic anhydride (MA), Nadicmethyl anhydride (NMA) and Dodecenyl succinic anhydride (DDSA).

10. A process as claimed in claim 9, wherein the anhydride is Hexahydro phthalic anhydride.

11. A process as claimed in claim 9, wherein the anhydride is Methylhexahydrophthalic anhydride.

12. A process as claimed in claim 9, wherein the anhydride is Dodecenyl succinic anhydride.

13. A process as claimed in claim 9, wherein the anhydride is present in the range of 50 to 90% of the Diglycidylether of bisphenol-A.

14. A process as claimed in claim 9, wherein the anhydride is present in the range of 50 to 70% of the Diglycidylether of bisphenol-A.

15. A process as claimed in claim 9, wherein the anhydride is present in the range of 50 to 65% of the Diglycidylether of bisphenol-A.

16. A process as claimed in claim 1, wherein the accelerator is selected from the group consisting of dimethylaminomethyl phenol, Benzyl dimethyl amine, 1-methylimidazole, 2-methylimidazole, 2-ethyl-4-methylimidazole, Benzyl triethyl ammonium chloride, Boron trifluride amine complex and boron trifluoride mono ethylamine.

17. A process as claimed in claim 16, wherein the accelerator is 1-methylimidazole.

18. A process as claimed in claim 16, wherein the accelerator is 2-mehylimidazole.

19. A process as claimed in claim 16, wherein the accelerator comprises a solution of 2-ethyl-4 methyl-imidazole in non-reactive diluents.

20. A process as claimed in claim 19, wherein the non-reactive diluent is selected from the group consisting of Dibutyl phthalate, Benzyl alcohol, Dioctyl phthalate, Polypropylene glycol, Polyethylene glycol, Mono propylene glycol and PTMEG.

21. A process as claimed in claim 1, wherein the accelerator is in the form of a solution with a concentration in the range of about 0.5 to 10% with respect to the reaction mass either alone or in a solution with compatible diluents.

22. A process as claimed in claim 21, wherein the concentration of the accelerator used in solution form is 40%.

23. A process as claimed in claim 1, wherein the fiber is selected from the group consisting of carbon, glass, polymer and natural fibers.

24. A process as claimed in claim 1, wherein the fiber is glass fiber.

25. A process as claimed in claim 1, wherein the partial curing is done in an oven at a temperature in the range of 45 to 50° C.

26. A process as claimed in claim 1, wherein the method step c is performed at 80° C. for 3 hrs.

27. A process as claimed in claim 1, wherein the method step d is performed at 90° C. for 8 hrs.

* * * * *